Nov. 1, 1966  W. J. DYKHOUSE  3,281,981
LINE, HOOK AND BAIT HOLDER ATTACHMENT
Filed Aug. 7, 1964

INVENTOR.
WILLIAM J. DYKHOUSE
BY
ATTORNEYS

3,281,981
LINE, HOOK AND BAIT HOLDER ATTACHMENT
William J. Dykhouse, 1118 Colfax St.,
Grand Haven, Mich.
Filed Aug. 7, 1964, Ser. No. 388,049
4 Claims. (Cl. 43—25.2)

This invention relates to a fishhook and line holder for a fishing pole, and more particularly to an attachable holder having gripping jaws to receive the fishhook.

Fish lines and attached fishhooks wound on an unused pole or dangling from it present a hazard as well as a substantial nuisance. Various devices, both simple and complex, have been conceived heretofore in efforts to anchor the hook securely to the pole. Since, however, such units are too complex and expensive, or too flimsy and unreliable, fishermen simply resort to such old measures as winding tape around the line and hook.

It is an object of this invention to provide a fishhook and line holder that is attachable securely to a fishing pole easily and quickly, and yet remains completely rigid and reliable on the pole during extended use.

Another object of this invention is to provide an attachable fishhook holder initially adjustable to fit any known size pole, and yet secure when mounted. Moreover, the holder is suitable for single hook or triple hooks. Its components cooperate in a unique fashion to achieve multiple functions, thereby effecting a relatively simple, over-all construction.

These and several other objects of this invention will become apparent upon studying the following specification in conjunction with the drawings in which.

Figure 1:
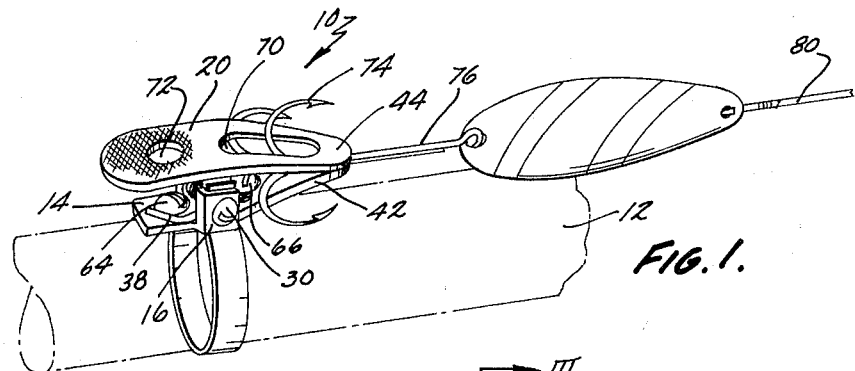
FIG. 1 is a perspective view of the novel holder attached to a pole (illustrated in phantom)
Figure 2:
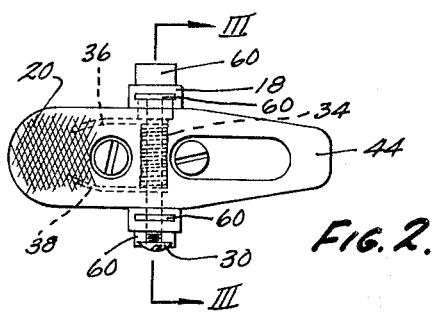
FIG. 2 is a plan view of the holder.

The basic holder 10 is shown in FIG. 1 attached to a fishing pole 12. The holder includes a lower element 14 in the form of an elongated rigid plate or finger, having a pair of upstanding ears 16 and 18 intermediate its ends. This element is pivotally interconnected with an upper plate element or finger 20 having a pair of depending ears 22 and 24 intermediate its ends, and on opposite sides thereof, straddled by ears 16 and 18.

The upstanding ears 16 and 18 each have vertical slots 26 and 28 respectively, extending in the plane of the ears, i.e. parallel to ears 22 and 24. The pivotal interconnection of the elements is achieved by a pin 30 in the form of a screw extending through ear 16, ear 24, ear 22 and partially through ear 18 into slot 28. A torsion spring 34 is wrapped around screw 30 with one free end 36 abutting the underside of element 20, and the opposite free end 38 abutting the upper surface of element 14. This torsion spring, therefore, biases ends 42 and 44 of elements 14 and 20 into abutting relationship to cause the forward ends thereof to form jaws. These gripping jaws are bent toward each other to keep an opening therebetween when in abutting relationship. The end of each jaw preferably has a small concavity, i.e. concavities 50 and 52 in jaws 44 and 42 to receive the shank of a fishhook.

A flexible, bendable, but non-stretchable tension band 60, preferably of a thin gauge sheet metal, has its opposite ends attached to the outer straddling ears 16 and 18. These opposite ends are received in slots 26 and 28. Screw 30 extends through a hole in the end of the band in slot 26. The opposite butt end of the screw engages the opposite end of the band in slot 28 and squeezes it against the outer wall of this slot. Thus, when screw 30 is tightened, it lockingly secures this opposite end of the band to hold a constant length on the band loop.

Figure 3:
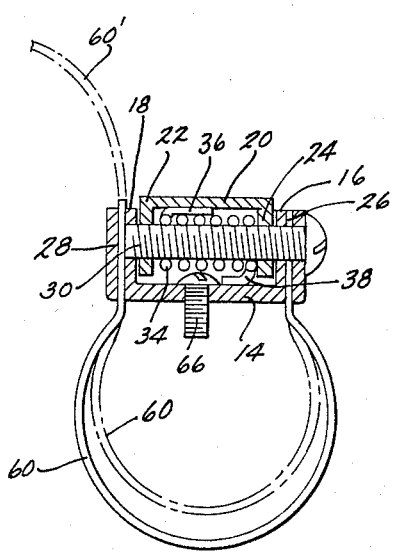
FIG. 3 is a sectional view of the holder taken on plane III–III of FIG. 2.

The length of the band can be controlled or, i.e. adjusted, by loosening screw 30 and sliding the band through slot 28 one way or another to form the enlarged loop illustrated in solid lines in FIG. 3, for example, or the smaller loop illustrated by phantom lines. The band is originally of extra length as shown at 60' phantom in FIG. 3. It is thus originally readily attached and pulled to the appropriate sized loop. This can then be cut off or broken off by bending the band back and forth several times. The unit therefore can readily accommodate various diameter poles. Once the band is adjusted, actual tightening on the pole is achieved by a pair of set screws 64 and 66 extending down through lower element 14 on opposite sides of the loop and ears. These screws are, therefore, substantially in a plane along the length of the pole, and perpendicular to the plane of the band loop. Screw 66 can be tightened by access through elongated cutout opening 70 in the jaw end of the upper element. Screw 64 can be tightened or loosened by access through cutout opening 72 in the opposite end of element 20. The elongated opening 70 also enables one barb 74 of a triple hook 76 on a bait such as the daredevil shown, to extend therethrough, thereby enabling the holder to accommodate triple hooks as well as single hooks.

Figure 4:
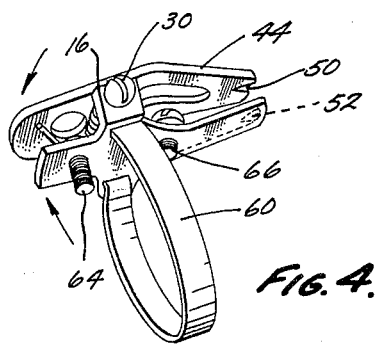
FIG. 4 is a perspective view of the underside of the holder.

During use, jaws 42 and 44 are opened by pressing the opposite ends of the elements toward each other as indicated by the arrows in FIG. 4. This opens the jaws against the bias of torsion spring 34, enabling the shank of hook 76 to be inserted in openings 50 and 52. If the hook is a triple hook, barb 74 extends upwardly through opening 70, with the other two barbs extending laterally out the sides of the jaws. The fishing reel is then actuated to tighten the fishing line 80 attached to the hook or bait, causing the complete assembly to be secure.

To attach the unit to a fishing pole of any particular size, screw 30 is loosened and band 60 is placed around the diameter of the pole. The end of the band extending through slot 28 is then pulled until the band is fairly snug around the pole. Screw 30 is then tightened to mash the end of the band against the surface of the slot 28. Then, with a screwdriver inserted through openings 70 and 72, set screws 66 and 64 are tightened to lock the unit firmly to pole 12. The excess band is broken off. With these simple operations, the unit is ready for extended use in a trouble-free manner. It is rigid and secure, yet normally out of the way. It can be placed at any position along the pole desired. The pin or screw 30 serves the multiple function of a pivot mount, a support for the torsion spring, and a tightening and holding member for the band. The device can be manufactured relatively simply and inexpensively, and has been found to operate extremely effectively.

Additional objects and advantages of this device may be apparent to those having ordinary skill in the art, once they have studied the foregoing description presenting the preferred form of the device. Also, it is conceivable that certain minor deviations in structure can be achieved in the broader aspects of this invention without departing from the concept presented. Consequently, the invention is not to be limited in its broadcast aspects to the specific preferred form shown, but only by the scope of the appended claims and the reasonably equivalent structures to those defined therein.

I claim:

1. A pole attachment fishhook holder comprising: an upper element and a lower element pivotally interconnected with each other intermediate the ends thereof; biasing means causing engagement of the elements at one end thereof to form jaws, and said jaws being shiftable out of said engagement against the bias; a flexible elongated band connected at its opposite ends to opposite sides of said elements and having one end slidably received in socket means on one of said sides to form a loop capable of extending around a pole; binding screw means extending into said socket means and bindingly engaging said one band end therein for locking said one end in said socket means; and shiftable tightening means on said holder, shiftable into said loop and thus towards a pole therein, to push said holder slightly away from the pole and thereby tighten said band.

2. A pole attachment fishhook holder comprising: an upper element having ears, and a lower element having ears; a pivot pin pivotally mounting said ears of said elements; a flexible elongated band connected on its opposite ends to opposite sides of said holder; a pair of set screws extending down through said lower element; and said upper element having cut-out portions allowing access to said set screws.

3. A pole attachment fishhook holder comprising: a first element comprising an elongated plate having a pair of upstanding ears on opposite sides and intermediate the ends thereof; a second element comprising an elongated plate having a pair of depending ears on opposite sides intermediate the ends thereof; said upstanding ears straddling said depending ears; said upstanding ears each having a slot therein forming sockets in the planes of said upstanding ears; a flexible holding band having opposite ends slidably inserted in said slots; a transverse screw extending through one of said upstanding ears and one end of said band, through both depending ears, and into the slot of the second upstanding ear against one end of said band; said screw forming a pivot axis between said elements and also forming releasable locking means for said one end of said band, to allow length adjustment thereof; adjacent ends on one end of said elements forming gripping jaws; and means normally biasing said jaws into engagement for gripping a hook.

4. A pole attachment fishhook holder comprising: a first element comprising an elongated plate having a pair of upstanding ears on opposite sides and intermediate the ends thereof; a second element comprising an elongated plate having a pair of depending ears on opposite sides intermediate the ends thereof; said upstanding ears straddling said depending ears; said upstanding ears each having a slot therein forming sockets in the planes of said upstanding ears; a flexible holding band having opposite ends slidably inserted in said slots; a transverse screw extending through one of said upstanding ears and one end of said band, through both depending ears, and into the slot of the second upstanding ear against one end of said band; said screw forming a pivot axis between said elements and forming releasable locking means for said one end of said band to allow length adjustment thereof; a pair of set screws extending down through said first element on opposite sides of said screw to tighten said holder to a pole; a pair of openings in said second element allowing access to said set screws; adjacent ends on one end of said elements extending toward each other into abutting relationship forming gripping jaws; torsion spring means around said screw normally biasing said jaws into engagement for gripping a hook; and the opening closest said jaws being elongated to allow for passage of the barb portion of a hook therethrough.

References Cited by the Examiner

UNITED STATES PATENTS

| | | | |
|---|---|---|---|
| 691,364 | 1/1902 | Denckla. | |
| 1,315,986 | 9/1919 | Radcliff | 43—25.2 |
| 1,412,187 | 4/1922 | Lopdell | 24—278 |
| 2,715,292 | 8/1955 | Williams | 43—25.2 |

FOREIGN PATENTS

| | | |
|---|---|---|
| 1,103,691 | 5/1955 | France. |

References Cited by the Applicant

UNITED STATES PATENTS

| | | |
|---|---|---|
| 744,462 | 11/1903 | Bishop. |
| 847,298 | 3/1907 | Sullivan. |
| 911,117 | 2/1909 | Crosier. |
| 1,601,945 | 10/1926 | Davis. |
| 2,527,625 | 10/1950 | Fields. |
| 2,715,292 | 8/1955 | Williams. |
| 2,721,413 | 10/1955 | Seidel. |
| 2,849,825 | 9/1958 | Reisner. |
| 2,943,414 | 7/1960 | Tussing. |

ABRAHAM G. STONE, *Primary Examiner.*

SAMUEL KOREN, *Examiner.*

R. L. HOLLISTER, *Assistant Examiner.*